(12) United States Patent
Kutscher et al.

(10) Patent No.: US 11,611,648 B2
(45) Date of Patent: Mar. 21, 2023

(54) METHOD AND APPARATUS FOR CONTACTING EMERGENCY SERVICES

(71) Applicant: Universal Physicians, LLC, North Canton, OH (US)

(72) Inventors: Andy C. Kutscher, Canton, OH (US); Joseph E. Frantz, Massillon, OH (US)

(73) Assignee: Universal Physicians, LLC, North Canton, OH (US)

(*) Notice: Subject to any disclaimer, the term of this patent is extended or adjusted under 35 U.S.C. 154(b) by 0 days.

(21) Appl. No.: 17/325,385

(22) Filed: May 20, 2021

(65) Prior Publication Data

US 2021/0392222 A1 Dec. 16, 2021

Related U.S. Application Data

(60) Provisional application No. 63/037,646, filed on Jun. 11, 2020.

(51) Int. Cl.
| | |
|---|---|
| *H04M 1/72418* | (2021.01) |
| *H04M 1/72439* | (2021.01) |
| *H04W 76/50* | (2018.01) |
| *H04W 4/90* | (2018.01) |

(52) U.S. Cl.
CPC ... *H04M 1/72418* (2021.01); *H04M 1/72439* (2021.01); *H04W 4/90* (2018.02); *H04W 76/50* (2018.02)

(58) Field of Classification Search
CPC .... H04M 1/72418; H04W 4/90; H04W 76/50
USPC ........................................................ 455/404.1
See application file for complete search history.

(56) References Cited

U.S. PATENT DOCUMENTS

| | | | | |
|---|---|---|---|---|
| 2003/0012344 A1* | 1/2003 | Agarwal | ............... | H04M 11/045 379/37 |
| 2011/0319048 A1* | 12/2011 | Matlock | ............... | G08B 25/006 340/539.11 |
| 2014/0368601 A1* | 12/2014 | deCharms | ............... | H04N 7/147 348/14.02 |
| 2018/0027103 A1* | 1/2018 | Chacon | ............. | H04M 1/72412 455/420 |

* cited by examiner

*Primary Examiner* — Maria El-Zoobi
(74) *Attorney, Agent, or Firm* — Sand, Sebolt & Wernow Co., LPA (57) ABSTRACT

A personal medical device which may allow for direct connection with emergency medical dispatch services via the emergency wireless network while simultaneously allowing the device to store and automatically contact one or more emergency contact persons utilizing a standard wireless internet connection and/or a connection through an intermediate device.

17 Claims, 5 Drawing Sheets

METHOD AND APPARATUS FOR CONTACTING EMERGENCY SERVICES

CROSS REFERENCE TO RELATED APPLICATIONS

This application claims the benefit of U.S. Provisional Application Ser. No. 63/037,646, filed on Jun. 11, 2020; the disclosure of which is incorporated herein by reference.

TECHNICAL FIELD

The present disclosure relates to a personal medical device. More particularly, in one example, the present disclosure relates to an emergency personal medical device worn on the body. Specifically, in another example, the present disclosure relates to an emergency personal medical device worn on the body to contact emergency services and others in the event of a medical emergency.

BACKGROUND

Background Information

Personal medical devices may include devices that are worn by an individual that are used primarily to contact emergency services in the event of an emergency. While not limited to these examples, these devices may include medical alert devices such as pagers, cellular telephones, watches, necklaces, bracelets, or other similar wearable technology. It is common for these devices to operate utilizing a cellular telephone plan, an internet connection, or the like to contact emergency services. Many available personal medical devices require a subscription and/or monitoring service for proper functionality.

Other personal medical devices may utilize the emergency wireless network established by the Federal Communications Commission (FCC) which mandates that emergency service communications, such as phone calls made directly to 911 services, be connected even if the device is not currently subscribed to a wireless carrier plan or is not in range of a subscribed wireless tower. For devices utilizing the emergency wireless network, the only requirement is to be within range of an active cellular telephone tower. Personal medical devices utilizing this network, therefore, do not necessarily require a cellular telephone plan nor do they require an active internet connection, either directly or through an intermediate device.

Commonly, these devices are configured as one-touch signaling devices, meaning that they include a single button or the like that connects them directly to an emergency services dispatcher. While these personal medical devices are important in times of emergency, particularly when the wearer or user of such a device is unable to reach or operate a telephone, typically the functionality of such devices are limited solely to a direct connection with emergency services. In instances where a person activates their personal medical device but is otherwise unable to reach or operate a secondary communications device such as a cellular telephone, it is therefore up to emergency services personnel to locate and/or contact the victim's emergency contact person or people. For example, in the common instance of a slip and fall where a person is injured and unable to reach a cellular telephone but is otherwise able to activate their personal medical device, it would be up to emergency services personnel responding to the call to determine who that victim's emergency contact is, the best way to get hold of them, and to make such contact.

SUMMARY

The present disclosure addresses these and other issues by providing a personal medical device which may allow for direct connection with emergency medical dispatch services via the emergency wireless network while simultaneously allowing the device to store and automatically contact one or more emergency contact persons utilizing a standard wireless internet connection and/or a connection through an intermediate device.

In one aspect, an exemplary embodiment of the present disclosure may provide a personal medical device comprising: a housing having an attachment mechanism operably connected thereto; a microphone; a speaker; an emergency button; and a camera; wherein the medical device is operable to generate a video signal to provide a video connection to a designated video contact while simultaneously operable to generate an emergency signal to provide a two-way audio connection to an emergency services dispatcher via a wireless network when the emergency button is activated.

In another aspect, an exemplary embodiment of the present disclosure may provide a method of contacting others in an emergency comprising: generating an emergency signal from a medical device via a wireless emergency network; connecting to an emergency services dispatcher via the emergency signal; generating a video signal from the medical device via an internet connection; and connecting to a video contact via the video signal; wherein generating the emergency signal and the video signal are accomplished by activating an emergency button on the medical device.

In another aspect, and exemplary embodiment of the present disclosure may provide a method of connecting to a video contact comprising: generating a video signal from a personal medical device having a camera, microphone, and speaker operably connected thereto; and connecting to a video contact via an internet connection; wherein generating the video signal is accomplished by the medical device in response to the activation of a non-emergency button on the medical device.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1A:
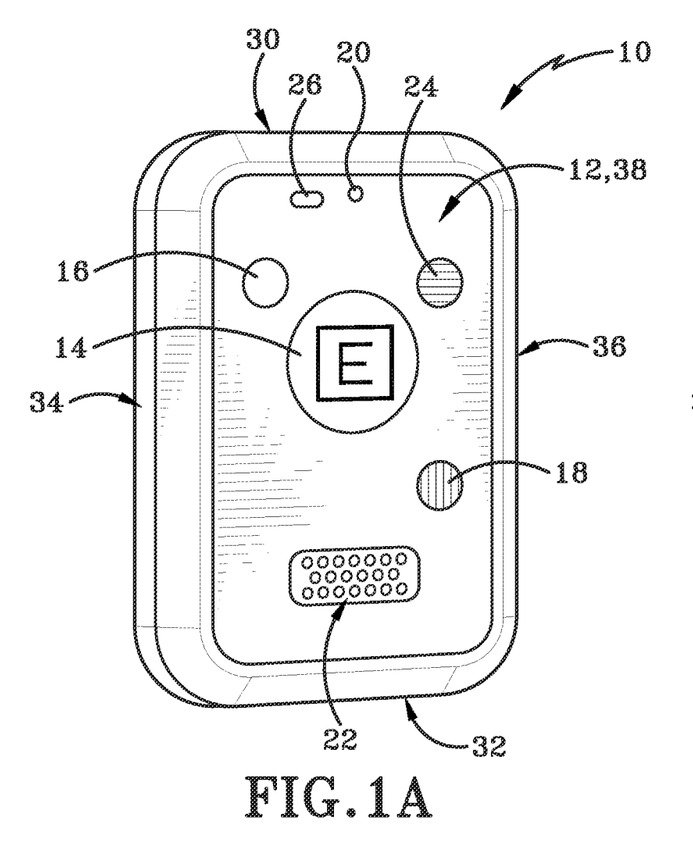
FIG. 1A is an isometric front elevation view of a personal medical device according to one aspect of the present disclosure.
Figure 1B:
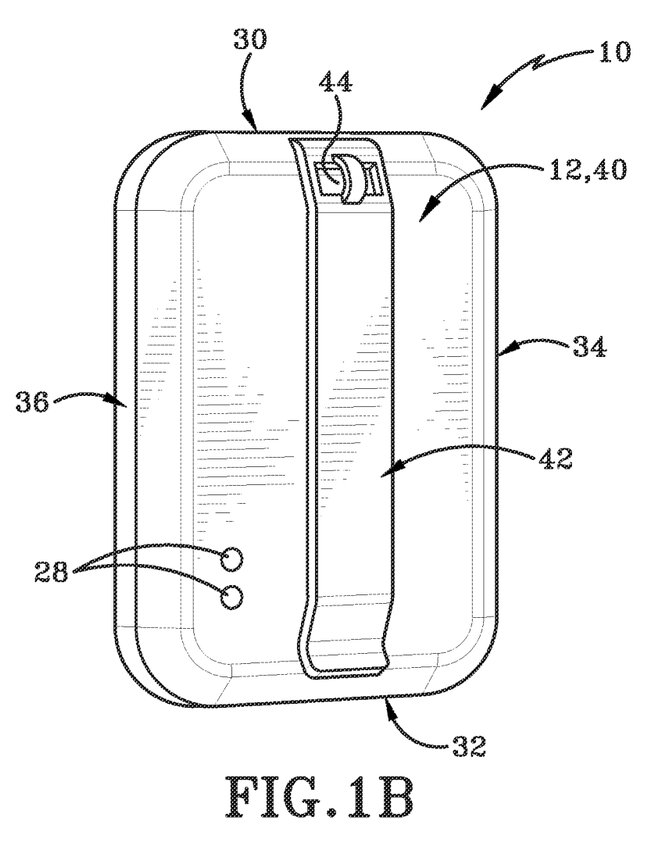
FIG. 1B is an isometric rear elevation view of a personal medical device according to one aspect of the present disclosure.

With reference to FIG. 1A and FIG. 1B, a personal medical device is shown and indicated at reference 10 and hereinafter referred to as medical device 10 or simply device 10. Medical device 10 may include a housing 12, an emergency button 14, a multi-function button 16, a camera control button 18, a microphone 20, a speaker 22, a camera 24, and an indicator light 26. Medical device 10 may further include one or more charging nodes 28.

Housing 12 of medical device 10 may have a top 30 spaced apart from a bottom 32 and defining therebetween a vertical direction. Housing 12 may further have a first side 34 spaced apart from a second side 36 and defining therebetween a horizontal or transverse direction. Housing 12 may further include a front face 38 spaced apart from a back face 40 and defining therebetween the thickness of device 10. As best seen in FIG. 1B, housing 12 may include a belt clip 42 and/or a lanyard slot 44, as discussed further below.

Housing 12 may be generally rectangular-shaped and may be sized to be comfortably worn or carried about a user's body or clothing to ensure that a user is more likely to keep device 10 on their person at all times to further increase the likelihood of use of device 10 in the event of an emergency. Although shown and discussed as having the general appearance of a pager, it will be understood that medical device 10 could be any suitably sized and/or shaped device as chosen and dictated by the desired implementation. For example, medical device 10 could be readily configured as a separate wearable such as a bracelet, watch, pager, necklace, or the like. Therefore it will be understood that although shown and described herein as a pager or pager-like device, medical device 10 may be any suitable personal medical device capable of carrying out the operations described herein.

Housing 12 may be constructed of any suitable material including but not limited to plastics, metal, or some combination thereof and may include other additional materials as dictated by the desired implementation. According to one aspect, housing 12 may be sealed or may otherwise include one or more gaskets or similar sealing surfaces that may allow housing 12 to be water-resistant or waterproof to protect any internal electronic components. According to another aspect, housing 12 may be a single piece construction to impart similar water-resistant or waterproof properties to device 10.

As seen and best depicted in FIG. 1A, the main operational components, namely, emergency button 14, multi-function button 16, camera control button 18, microphone 20, speaker 22, camera 24, and/or indicator light 26 may be integrated into device 10 such that each of these components interact with or are otherwise defined through the front face 38 of housing 12 to maintain a centralized and compact location and operation thereof, as discussed further herein.

According to another aspect, any or all of these components may be moved to any portion of the device and may interact or otherwise be defined in any surface of device 10 or the housing 12 thereof. For example, any of the buttons, i.e. emergency button 14, multi-function button 16, and/or cameral control button 18 may be moved to one of first side 34 or second side 36 as desired. Similarly, speaker 22, camera 24, and/or indicator light 26 may be likewise moved or repositioned as dictated by the desired implementation.

The function of emergency button 14, multi-function button 16, and/or camera control button 18 may be discussed further below with regards to the operation of device 10; however, each of these button 14, 16, and/or 18 may be formed of a rubberized or plastic material imparting sufficient flexibility into the buttons 14, 16, and/or 18 to allow depression thereof to complete an electronic circuit within device 10, as dictated by the desired implementation. Buttons 14, 16, and/or 18 may further be sealed to impart additional water-resistant or waterproof properties to device 10 and/or housing 12.

Microphone 20 may be a standard miniaturized microphone similar to those found in personal communications devices such as cellular telephones and other similar devices and may be integrated into device 10 and housing 12 in any suitable position or location, as dictated by the desired implementation.

Similarly, speaker 22 may be any suitable audio speaker that may be positioned and/or integrated into device 10 and housing 12 as dictated by the desired implementation and operation thereof and may be any suitable miniaturized speaker 22 similar to those used in common personal electronic devices such as cellular telephones and the like.

Camera 24 may likewise be any suitably sized and positioned camera 24 to allow for video recording and/or still photographs as dictated by the desired implementation. Camera 24 may be any suitable camera such as those commonly used in cellular telephones and other similarly sized and operated devices.

Indicator light 26 may be a light emitting diode or the like operable to display one or more colored lights indicative of the mode of operation, battery charge status, connection status, or any other suitable information capable of being displayed by an illuminated light, as discussed further herein with regards to the operation of device 10.

As best seen in FIG. 1B, device 10 may include one or more charging nodes 28 which may interact with a charging port on a cradle or similar device. According to one aspect, these nodes may be sealed to further enhance or improve the water-resistant or waterproof capabilities of device 10 and housing 12. According to another aspect, charging nodes 28 may be replaced by a sealed or otherwise water-resistant charging port (not shown) as dictated by the desired implementation. The charging of device 10 may necessarily include an internal rechargeable battery (not shown) which may be similar to those found in similarly sized personal electronic devices. According to another aspect, device 10 may have a removable or replaceable battery as dictated by the desired implementation.

Medical device 10 is contemplated to be worn about a user's body or clothing and may include one or more attachment mechanisms such as belt clip 42 and/or lanyard slot 44 for quick and easy attachment to a person's body and/or clothing. For example, belt clip 42 may allow for rapid attachment and detachment to a user's belt, pocket, waistband, purse/bag strap, or the like as chosen by the user. According to another aspect, lanyard slot 44 may allow for an attachment to a lanyard contemplated to be worn about a user's neck, or may be further connected to a necklace or the like. It is understood that device 10 is only effective as an emergency medical device when actually worn and available to a user in the event of an emergency. Therefore, device 10 may further include or optionally connect to other attachment mechanisms other than those listed and shown herein as dictated by the desired implementation provided those attachment mechanisms are likely to result in utilization by a user.

Figure 2:
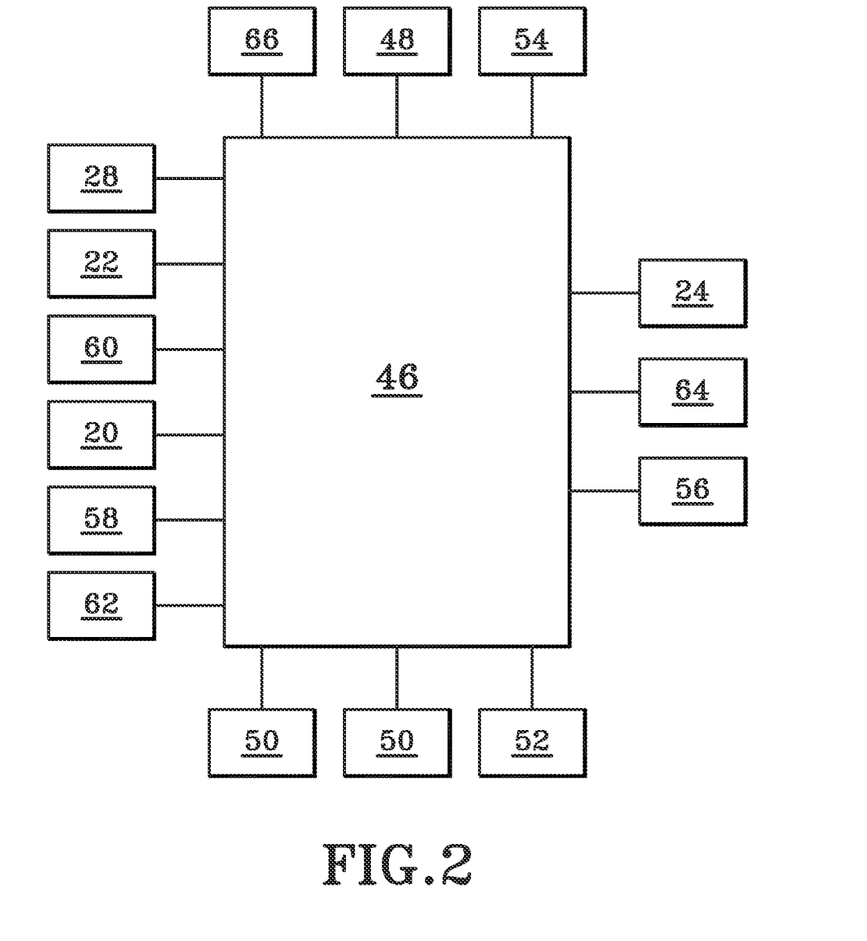
FIG. 2 is an exemplary block diagram of a personal medical device according to one aspect of the present disclosure.

With reference to FIG. 2, an exemplary block diagram is shown of additional components that may be contained within housing 12 of device 10 for proper operation and function thereof. Accordingly, device 10 may include a processor 46, a keypad control module 48, one or more memory modules 50, a vibration motor 52, a cellular transceiver 54, a Bluetooth transceiver 56, an FM transceiver 58, a receiver 60, a multi-function input/output device such as a USB module 62, an LED or light control module 64, and a cellular network subscriber identification module (SIM) 66.

Each of these components may be arranged or configured within device 10 internal to housing 12 as dictated by the desired implementation and may be operated according to their normal operation and/or according to the operation of their corresponding components as discussed further below. For example, Bluetooth transceiver 56 may be operated to generate and receive Bluetooth signals from an intermediate device utilized in the communications methods discussed below.

According to one example, vibration motor 52 may be a miniaturized vibrator as commonly used in consumer electronics such as cell phones, pagers, and the like. Vibration motor 52 may provide haptic or vibration feedback to an operator or user for any desired purpose including, but not limited to, indicating connections via vibration patterns or haptic feedback patterns to indicate that device 10 is connected to emergency services 70, video contact 74, and/or that the group messaging signal 76 has been sent and/or delivered. According to one aspect, vibration motor may also indicate disconnection between device 10 and any third party contacts. Vibration motor 52 may be or include any standard haptic or physical feedback system as dictated by the desired implementation.

It will be understood that device 10 may further include other features not discussed further herein as dictated by the desired implementation. According to one aspect, an additional feature that may be included or utilized is that of a global positioning system (GPS) module or component which may allow emergency services to locate medical device 10 upon a connection therebetween when activated by the emergency button 14. This may direct emergency services 70 to the operator or user of medical device 10 in the event that they are incapacitated or otherwise unable to provide an accurate location to emergency services. According to another aspect, medical device 10 may include other components such as an audible alarm component that may beep or provide another audible signal to likewise help direct others to the location of medical device 10. According to another aspect, device 10 may include a display, screen, or the like and may include additional functionality, such as text messaging, voice calling, or other suitable functionality as desired.

Having thus described the elements and components of personal medical device 10, the operation and function thereof will now be discussed.

Figure 3:
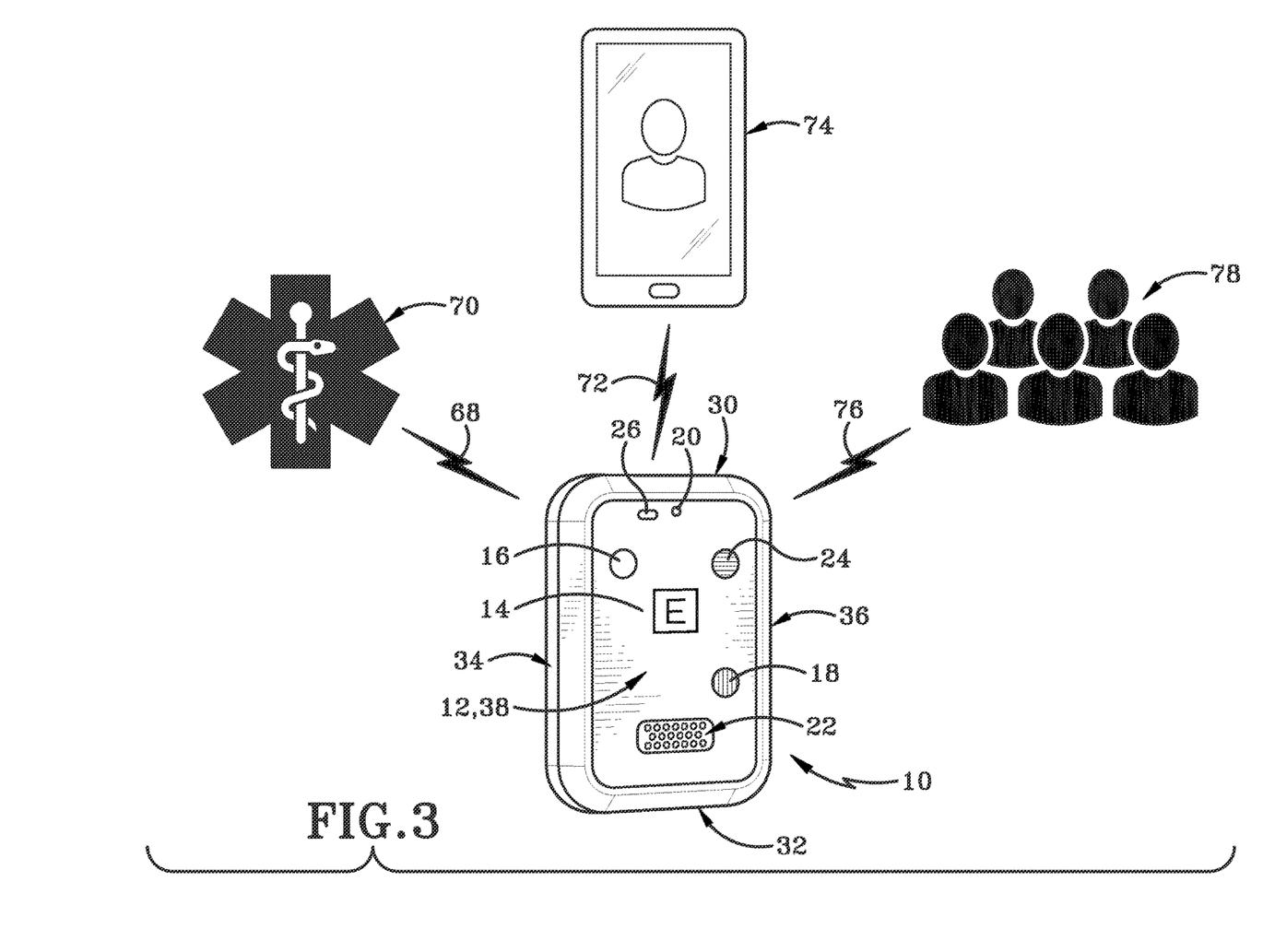
FIG. 3 is an operational view of a personal medical device according to one aspect of the present disclosure.

With reference to FIG. 3, medical device 10 may be utilized as a communication device in multiple ways. First, medical device 10 may be utilized similar to current personal medical devices to contact emergency services 70 via an emergency services signal 68. In this mode, a user may depress emergency button 14 which may direct device 10 to send out an emergency signal 68 via cellular transceiver 54 and/or FM transceiver 58. The signal may be generated and sent via the closest operable cellular or radio tower and may utilize the emergency wireless network to contact emergency services 70 without the need for a subscription-based service, a cellular telephone plan, or an active internet connection. If device 10 is within range of any active cellular or radio tower, it may utilize this network to contact emergency services 70.

When in contact with emergency services, the microphone 20 and speaker 22 of device 10 may likewise be activated to allow a two-way communications connection with emergency services 70 to allow the user to describe what the emergency is and/or where the user may be located. By way of one non-limiting example, if a user is carrying or wearing device 10 on their person and has a slip and fall from which they cannot arise and cannot reach or otherwise operate a secondary communications device, they may depress the emergency button 14 to generate the emergency signal 68 to contact emergency services 70. Once connected to emergency services, the user who is able to communicate but is otherwise unable to recover from their fall may describe the nature of their fall and their location to direct emergency services thereto. This is an example of a common use and function of current personal emergency devices providing a two-way audio connection to emergency services 70 as described herein.

In addition to the standard and current two-way audio connections, device 10 and the components thereof may further enable additional types of communication between the user of medical device 10 and others. A first additional communication may be a video connection directly to a predetermined emergency contact. This video connection may be via video signal 72 sent to the video contact indicated at 74. The video contact 74 may be preprogrammed into device 10 and stored in memory 50 such that when the emergency services button 14 is depressed, the emergency signal 68 is sent while simultaneously a video signal 72 is sent to the emergency video contact 74. The video signal 72 may be sent to the emergency video contact 74 via one or more of cellular transceiver 54, Bluetooth transceiver 56, and/or FM transceiver 58.

According to one aspect, device 10, if connected to a wireless internet connection, may generate a wireless signal via FM transceiver and may utilize the wireless internet connection to transmit the video signal 72 to video contact. Simultaneously, camera 24 may be activated along with microphone 20 and speaker 22 to allow the video contact 74 to view whatever camera 24 sees via a live video feed while having a two-way audio connection with the user of device 10. If an internet connection is not available to device 10, the video signal 72 may be sent via an active cellular subscription plan either directly, utilizing cellular transceiver 54, or indirectly such as through a Bluetooth connection with a nearby cellular device via Bluetooth transceiver 56. In this instance, the video signal will still be generated to video contact 74 while activating camera 24, microphone 20, and speaker 22 in the same manner as if sent over internet connection. Where no subscription cellular plan or internet connection is available, device 10 may still contact emergency services via emergency signal 68 as discussed previously herein.

Another communications method enabled by device 10 may include a group message sent as a group message signal 76 sent to a group of contacts 78. The group of contacts 78, as used herein, will be understood to be a preselected and/or preprogrammed contact 78 group which may consist of any number of members. The group of contacts 78 may include a single member or may have multiple members as desired by the person utilizing device 10. The video contact 74 may be included or may be excluded from the group 78 as desired.

Accordingly, when emergency button 14 is depressed, device 10 may simultaneously send emergency signal 68 and video signal 72 as discussed previously herein but may also generate a group messaging signal 76 which may be sent directly to an emergency contact group 78.

Group messaging signal may be a preselected or a preset short messaging service (SMS) message and/or multimedia messaging service (MMS) message which may be sent out via cellular transceiver 54 if connected to an active cellular subscription plan, via Bluetooth transceiver 56 by way of a secondary cellular device as described with video signal 72, and/or via an active internet connection as also described with reference to video signal 72. According to one aspect, device 10 may send an emergency message to the group contacts 78 indicating that an emergency has occurred and providing further instructions. As with video signal 72, where an internet connection and/or an active cellular data connection are not available, device 10 may still contact emergency services 70 via emergency signal 68.

Multi-function button 16 may be, as the name implies, utilized to control multiple functions of device 10. For example, where no other buttons have pressed, a brief press of multi-function button 16 may provide a first function which may be a battery check giving an audible and/or visual indication of the battery level via speaker 22 and/or indicator light 26, respectively. A longer press and hold of multi-function button 16 may provide a system reset or memory reset, as desired. When emergency button 14 has been depressed but was either done unintentionally or not in the event of an emergency the emergency call may be cancelled, by pressing and/or pressing and holding multi-function button 16. This may cancel emergency signal 68 and other related transmissions such as video signal 72 and/or messaging signal 76.

Camera control button 18 may allow for a direct video signal 72 to be sent to video contact 74 without a separate connection to emergency services 70. This may be useful in the event of minor but not life-threatening emergencies such as the example of a minor injury or illness wherein the user of device 10 wishes to contact their emergency video contact 74 quickly but it does not require the intervention of emergency medical services 70. Additionally, camera control button 18 may be utilized via a second press to cancel an existing video signal 72 and/or video connection to video contact 74. For example, in the event of an emergency, the user may wish to cancel the video contact, for example, upon the arrival of emergency services 70 while maintaining an open connection to emergency services 70 via emergency signal 68. In this instance, cancelling the emergency signal 68 is not desirable while cancelling the video signal 72 may be desired. Therefore, depressing camera control button 18 during such a connection may terminate that video signal 72 while allowing the connection to emergency services 70 to remain active, as desired.

As mentioned above, indicator light 26 may be utilized to indicate a battery charge status. For example, a green indication from indicator light 26 may indicate a suitable charge while orange or yellow may indicate a low charge and a red may indicate a critically low charge. These colors are exemplary and are understood to be one manner in which indicator light 26 may be used, not as a limiting example thereof. Accordingly, it will be understood that indicator light 26 may be of any color or color combination as desired and may be utilized to provide any desired visual feedback to a user of device 10. According to another aspect, indicator light 26 may be used to show that device 10 is powered on and active. According to yet another aspect, indicator light 26 may also be used to indicate an active and open connection to one or more of emergency services 70, video contact 74, and/or contact group 78. For example, a blinking light or a specific light color may be utilized to indicate a connection to emergency services 70 while a different blinking pattern (e.g. a faster or slower blink, as desired) may indicate an active video connection to video contact 74.

Although described herein without a video screen, device 10 may be readily adapted to include a video display or similar display which may allow for two-way video communications between the user of device 10 and the video contact 74. According to another aspect, device 10 may be connected to or otherwise in communication with a cellular telephone, tablet, desktop computer, or the like that may be running a connected or related application which may allow two-way audio/video communication via camera 24, microphone 20, and speaker 22 while further allowing two-way video communication via the secondary device running the application.

It will further be understood that medical device 10 may further include or otherwise adapted to include additional elements or components which may be utilized to automatically perform one or more of the processes described herein. For example, where medical device 10 may be configured as a wearable device such as a bracelet or a watch, it may further include devices such as a heart rate monitor, blood glucose monitor, blood oxygen monitor, blood pressure monitor, or the like which may be configured or preset to prompt an automatic contact to emergency services 70, video contact 74, and/or group contact 78 when a certain condition is present or met.

Figure 4:
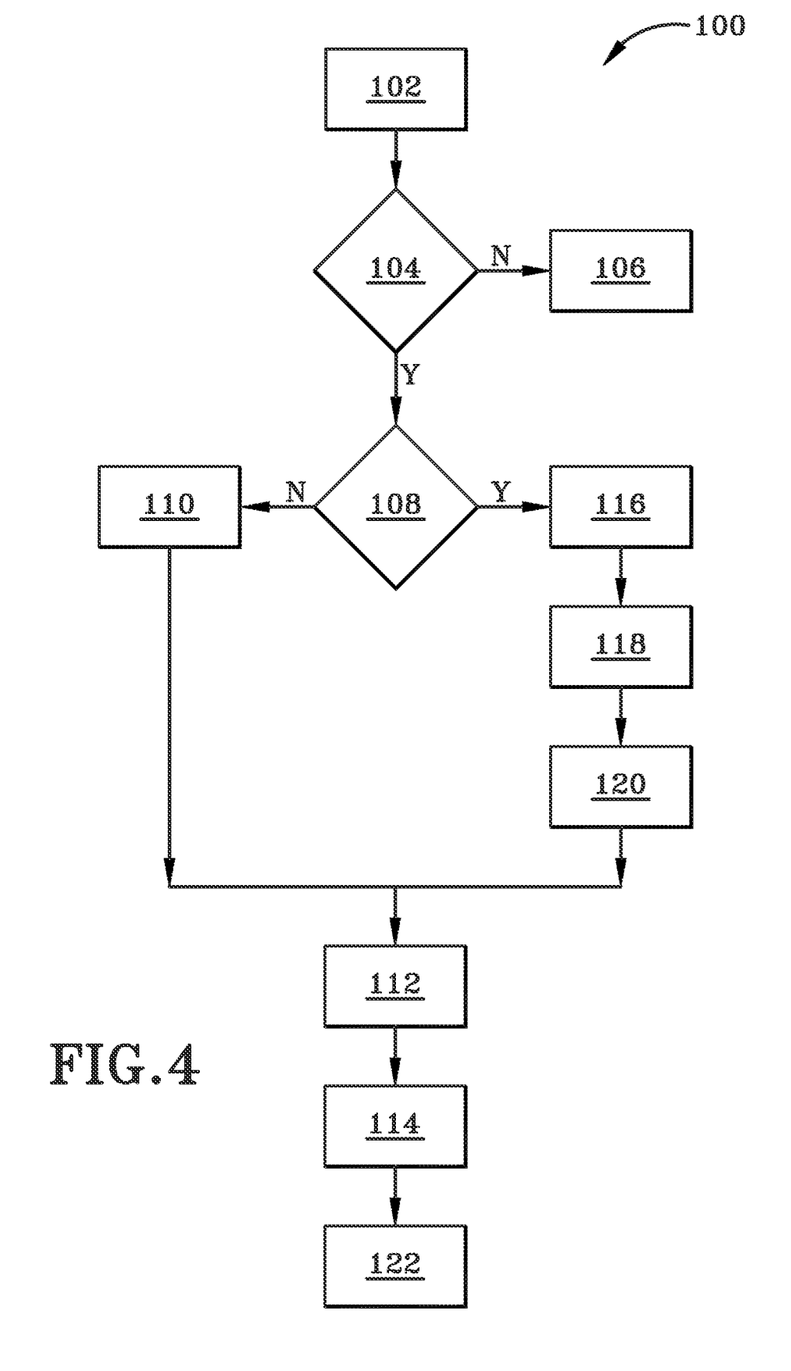
FIG. 4 is a decision tree and flow chart of one method of use for a personal medical device according to one aspect of the present disclosure.

With reference to FIG. 4, a flowchart and decision tree is shown and indicated as process 100. Process 100 is an exemplary process that may be automatically followed or employed by device 10 when a user depresses the emergency button 14.

Accordingly, process 100 begins with step 102 wherein the emergency button 14 is depressed or pushed. Upon registering that the button has been pushed, step 104 is a decision step wherein the user/operator of device 10 is given the opportunity to cancel the pressing of emergency button 14. For example, if pressing the emergency button 14 was intentional; i.e., there is, in fact, an emergency, the user may do nothing and device will proceed with the next steps of process 100. If pressing the emergency button 14 was not desired, the user may cancel the call using the multi-function button 16 as discussed previously herein (or by any other programmed action, such as pressing the emergency button 14 a second time, or the like). The cancellation of an emergency call is indicated as step 106 in process 100.

Assuming that an emergency exists, device 10 may then determine if there is an internet/data connection available to device 10 via a Wi-Fi connection or the like, or through a secondary device such as a Bluetooth connection to a cellular telephone. The check for an internet and/or data connection is indicated as step 108.

If there is not an available internet or data connection, device 10 may proceed to step 110 wherein an emergency signal 68 is sent out in an attempt to contact emergency services 70. Assuming a successful connection to emergency services, device 10 may then activate the microphone 20 in step 112 and activate the speaker 22 in step 114 to allow two-way communications between the operator or user of device 10 and emergency services 70.

Upon completion of the emergency call, which may vary depending on the specific circumstances surrounding the emergency, the emergency services connection may be completed and ended in step 122, thus completing process 100 when device 10 is not connected to the internet or a data connection or is not located in an area with an internet or data connection. Step 122 may be accomplished manually, i.e. through an active act of the user to cancel or otherwise terminate the connection, or automatically via a disconnection from emergency services 70.

While shown in linear fashion, it will be understood that process 100 may be performed in any order and some steps may be performed simultaneously. For example, the activation of the microphone 20 and speaker 22 may occur simultaneously with sending out the emergency signal 68.

Where device 10 is connected to or otherwise able to utilize an internet or data connection as determined in step 108, device 10 may simultaneously contact emergency services as indicated previously in step 110 while also connecting to the predetermined video contact 74 by way of sending a video signal 72. The connection to the video contact 74 is indicated as step 116 in process 100. As the connection is made to the video contact 74, device 10 may simultaneously or in succession activate the camera 24 in step 118 to allow.

In addition to connecting to the video contact 74, device 10 may also generate group messaging signal 76 and send that signal out to the predetermined contact group 78 in step 120. As discussed above, while the video signal 72 and group messaging signal 76 are being sent, device 10 may simultaneously be contacting emergency services 70 via emergency signal 68 in steps 110 while also activating the microphone and speaker in steps 112 and 144, respectively. As further discussed above with regards to the emergency services 70 contact, once the desired contacts and/or transmissions are over, the connections to emergency services 70, video contact 74, and/or the contact group 78 may be ended or terminated via step 122 of process 100.

Figure 5:
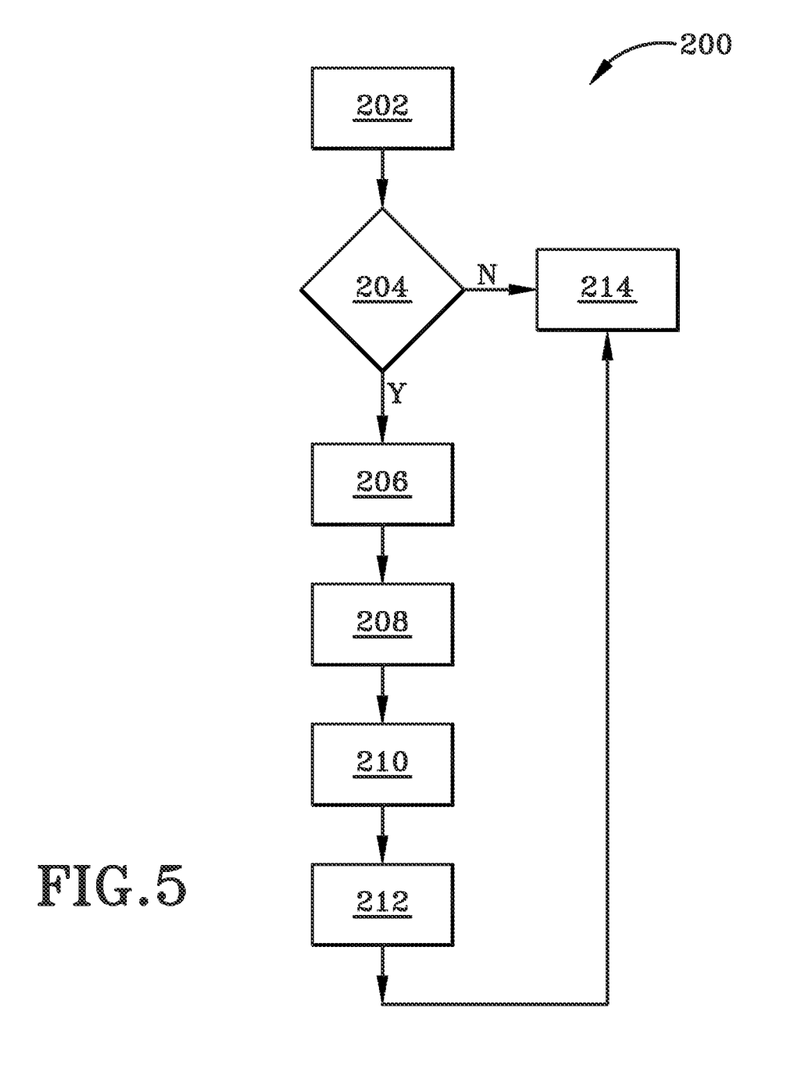
FIG. 5 is a decision tree and flow chart of one method of use for a personal medical device according to one aspect of the present disclosure.

With reference to FIG. 5, a second process is shown and indicated as process 200. This process may involve similar steps as process 100 but is contemplated to be a process utilized by device 10 and the user or operator thereof when a video connection to video contact 74 is desired but not in the instance of an emergency. According to one aspect, as provided in an example above, a video connection to the video contact 74 may be desired in situations where there is a minor illness or injury, or in another scenario that warrants video contact while a connection to emergency services 70 is undesirable or not required. It is in these types of scenarios that process 200 may be employed.

Accordingly, process 200 may begin with the depression of camera control button 18 in step 202. As with process 100, the next step in process 200 following the depression of camera control button 18 is for device 10 to check and determine if an internet and/or data connection is available. This step is indicated as step 204 in process 200.

Assuming a connection to the internet or to a data source is available to device 10, the next step, indicated as step 206, is to generate the video signal 72 to connect to video contact 74. Simultaneously, or in succession thereto, device 10 may activate the camera 24 in step 208, activate the microphone in step 210, and activate the speaker in step 212 to allow a two-way audio connection between the operator of device 10 and the video contact 74. Once the video connection is complete and the operator of device 10 and video contact 74 have concluded their video chat, the connect therebetween may be disconnected in step 214.

As seen in FIG. 5 at step 204, if medical device 10 determines there is no available internet or data connection at the time of pressing the camera control button 18, device 10 may forego the connection and activation of other components, and may disconnect or end the connection attempt via step 214 as indicated.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more"

of the elements so conjoined. Other elements may optionally be present other than the elements specifically identified by the "and/or" clause, whether related or unrelated to those elements specifically identified. Thus, as a non-limiting example, a reference to "element A and/or element B", when used in conjunction with open-ended language such as "comprising" can refer, in one embodiment, to element A only (optionally including elements other than element B); in another embodiment, to element B only (optionally including elements other than element A); in yet another embodiment, to both element A and element B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A personal medical device comprising:
   a housing having an attachment mechanism operably connected thereto;
   a microphone carried by the housing;
   a speaker carried by the housing and in connection with the microphone, the speaker and microphone being operable to generate an emergency signal to provide a two-way audio connection to an emergency services dispatcher via a wireless network;
   an emergency button carried by the housing; and
   a camera carried by the housing and operable to generate a video signal to provide a video connection to a designated video contact;
   wherein, in response to a first activation of the emergency button, the medical device simultaneously initiates the two-way audio connection to the emergency services dispatcher via the microphone and speaker and generates the video signal and video connection to the video contact via the camera; and
   wherein the video signal is only generated when the medical device is connected to the internet while the emergency signal is generated regardless of the availability of an internet connection.

2. The device of claim 1 further comprising:
   a camera control button operable to provide the connection to the video contact without providing the connection to the emergency services dispatcher.

3. The device of claim 1 wherein the medical device is further operable to generate a group messaging signal in response to the first activation of the emergency button when the medical device is connected to the internet.

4. The device of claim 1 wherein a second activation of the emergency button cancels both of the two-way audio connection to the emergency services dispatcher and the video signal.

5. The device of claim 3 wherein the medical device is operable to generate the emergency signal and provide the connection to the emergency services dispatcher without an internet connection.

6. The device of claim 1 wherein the video contact is predetermined and stored on the medical device.

7. The device of claim 6 wherein the video contact is able to view a live video feed from the camera.

8. The device of claim 1 wherein the attachment mechanism is operable to connect the medical device to a user's clothing.

9. A method of contacting others in an emergency comprising:
   activating an emergency button on a wearable personal medical device;
   generating an emergency signal from the medical device via a wireless emergency network;
   connecting to an emergency services dispatcher via the emergency signal;
   generating a video signal from the medical device via an internet connection; and
   connecting to a video contact via the video signal;
   wherein generating the emergency signal and the video signal are accomplished in response to a first activation of the emergency button on the medical device; and
   wherein the video signal is only generated when the medical device is connected to the internet while the emergency signal is generated regardless of the availability of an internet connection.

10. The method of claim 9 further comprising:
    generating a group messaging signal from the medical device via the internet connection in response to the first activation of the emergency button; and
    sending the group messaging signal to a contact group.

11. The method of claim 10 further comprising:
    canceling the connection to the emergency services dispatcher via the emergency signal, the connection to the video contact via the video signal, and the group messaging signal in response to a second activation of the emergency button.

12. The method of claim 10 wherein the video signal and group messaging signal are only generated when the medical device is connected to the internet while the emergency signal is generated regardless of the availability of an internet connection.

13. The method of claim 10 wherein the group messaging signal is one of a short messaging service signal and a multimedia messaging service message.

14. The method of claim 9 wherein the medical device further comprises:
    a camera control button operable to generate the video signal without generating the emergency signal.

15. The method of claim 9 wherein the video contact is able to view a live video feed from a camera on the medical device.

16. The method of claim 9 wherein the connection to the emergency services dispatcher is a two-way audio connection.

17. The method of claim 9 wherein the medical device further comprises:
    at least one attachment mechanism operable to connect the medical device to a user's clothing.

* * * * *